(No Model.)
7 Sheets—Sheet 1.
J. M. O'KELLY.
MOTOR TRAM CAR.
No. 477,444.
Patented June 21, 1892.
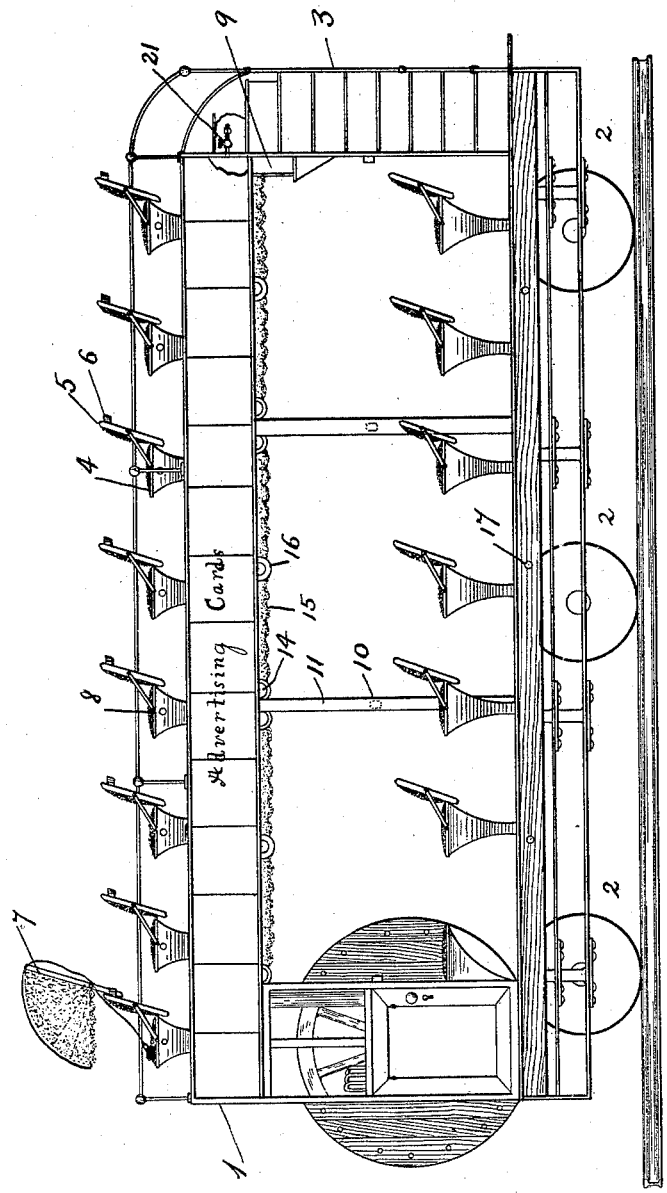
Witnesses
Frank Guile
Lillie Hanna
Inventor
James M. O'Kelly
by Knight Bros.
Attys.

(No Model.)  7 Sheets—Sheet 2.
J. M. O'KELLY.
MOTOR TRAM CAR.
No. 477,444.  Patented June 21, 1892.
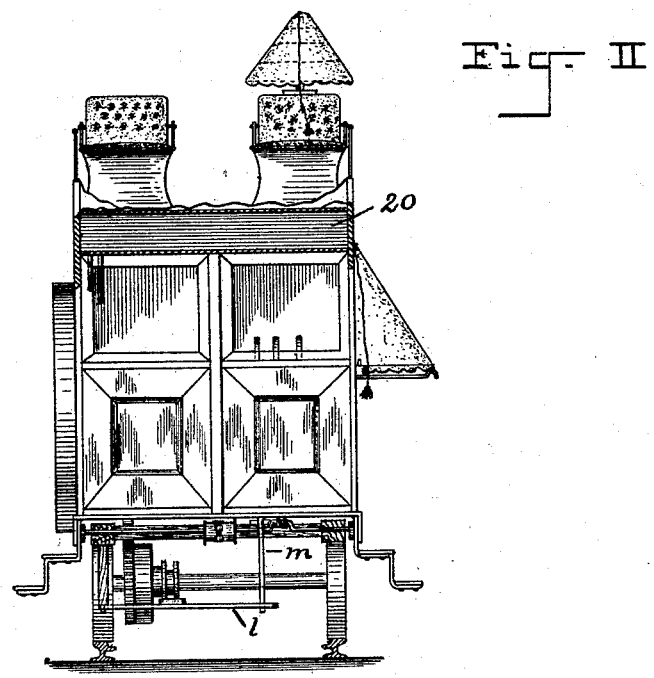
Fig. II
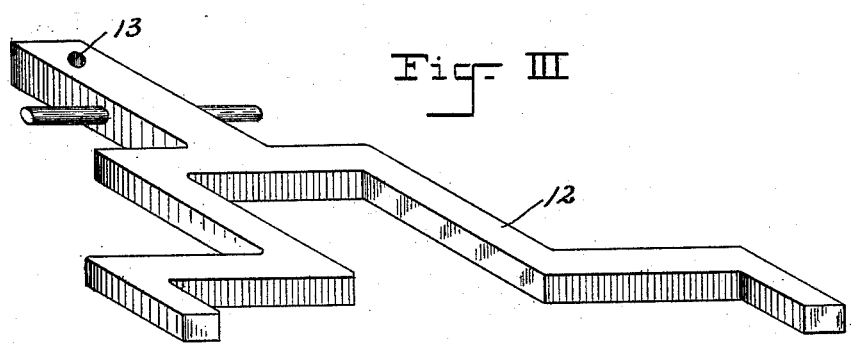
Fig. III
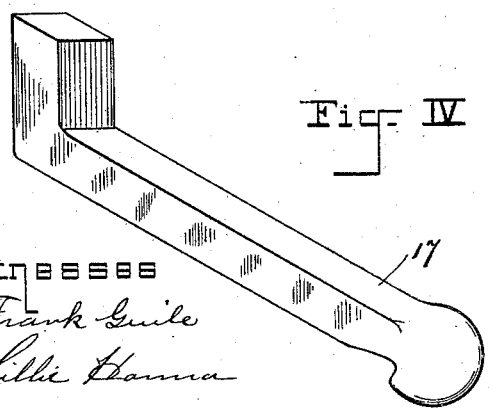
Fig. IV
Witnesses
Frank Guile
Lillie Hanna
Inventor
James M. O'Kelly
by Knight Bros
Attys.

(No Model.)
J. M. O'KELLY.
MOTOR TRAM CAR.
No. 477,444.
7 Sheets—Sheet 3.
Patented June 21, 1892.
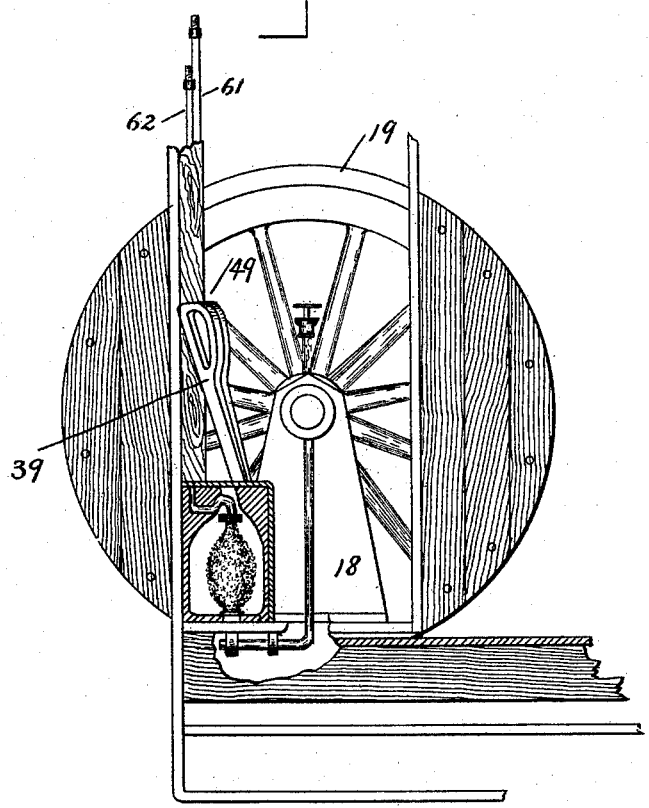
Fig. V
Witnesses
Frank Guile
Lillie Hanna
Inventor
James M. O'Kelly
by Knight Bros.
Attys.

(No Model.)
J. M. O'KELLY.
MOTOR TRAM CAR.
No. 477,444. Patented June 21, 1892.
7 Sheets—Sheet 4.
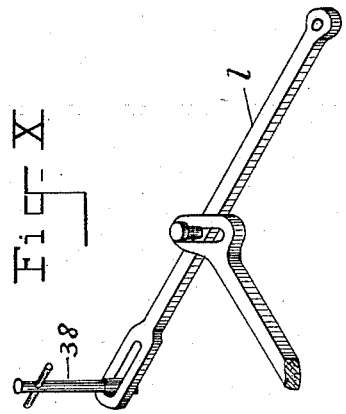
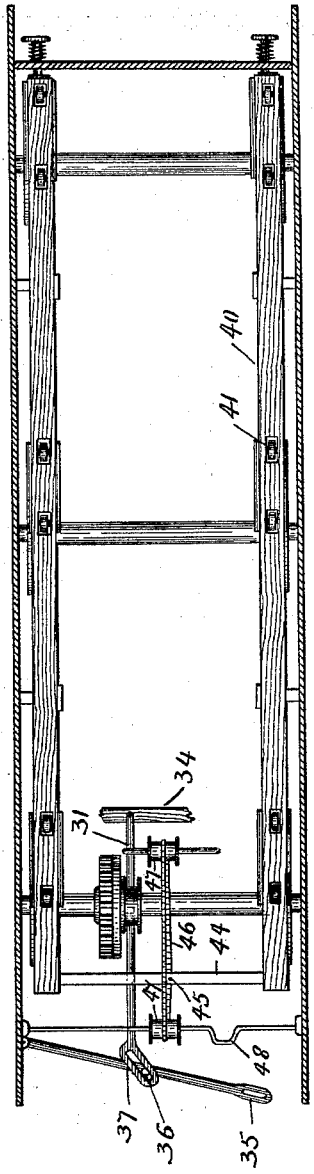
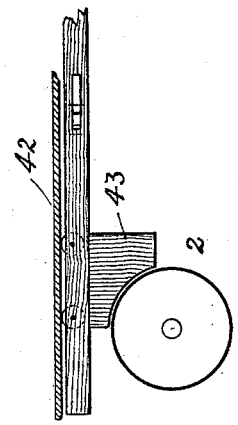
Witnesses
Frank Gude
Lillie Hanna
Inventor
James M. O'Kelly
by Knight Bros.
Attys (No Model.) 7 Sheets—Sheet 5.
J. M. O'KELLY.
MOTOR TRAM CAR.
No. 477,444. Patented June 21, 1892.
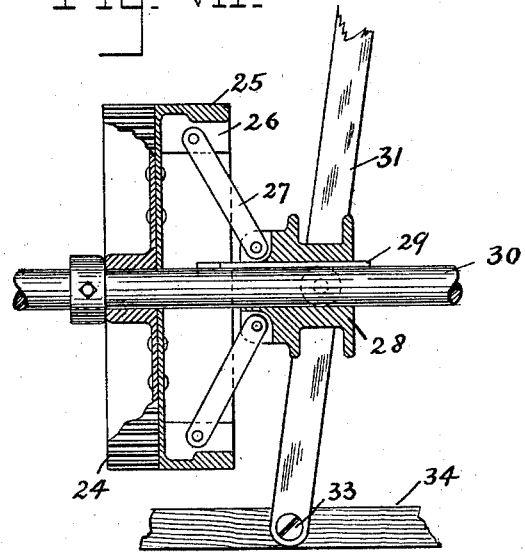
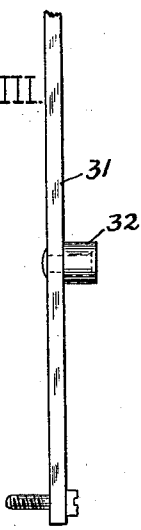
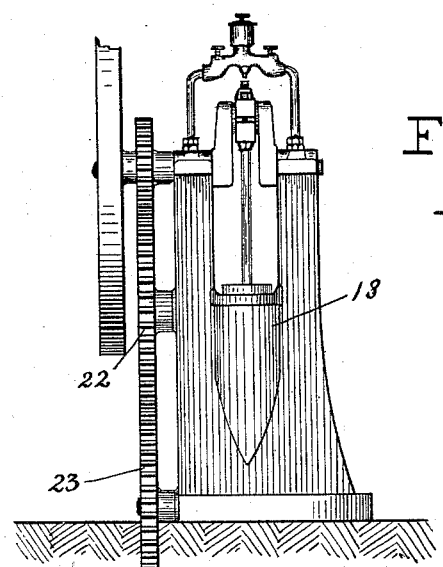
Witnesses
Frank Guile
Lillie Hanna
Inventor
James M. O'Kelly
by Knight Bros.
Attys.

(No Model.)  7 Sheets—Sheet 6.
J. M. O'KELLY.
MOTOR TRAM CAR.
No. 477,444.  Patented June 21, 1892.
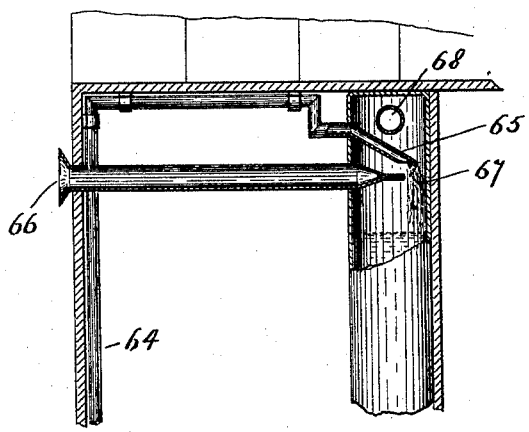
Fig. XII.
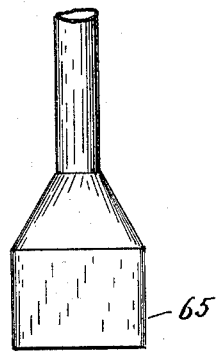
Fig. XIII.
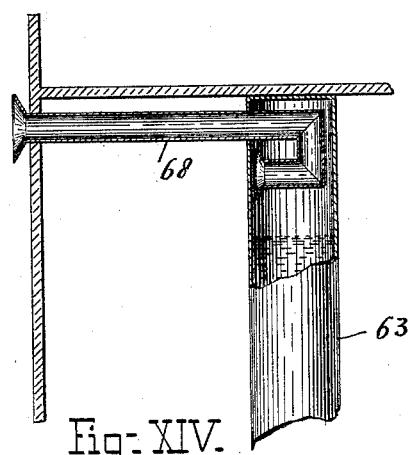
Fig. XIV.
Witnesses
Frank Guile
Lillie Hanna
Inventor
James M. O'Kelly
by Knight Bros.
Attys (No Model.) 7 Sheets—Sheet 7.
J. M. O'KELLY.
MOTOR TRAM CAR.
No. 477,444. Patented June 21, 1892.
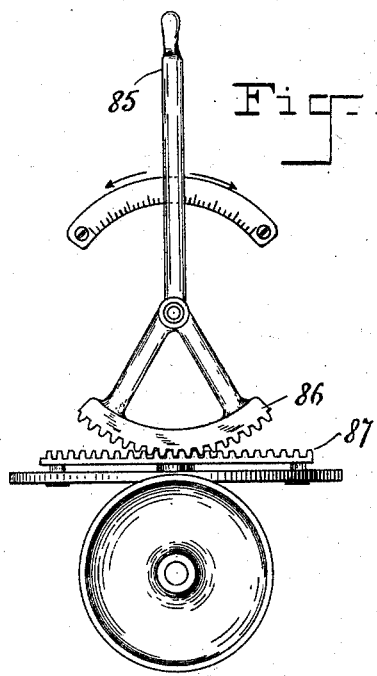
Fig. XV.
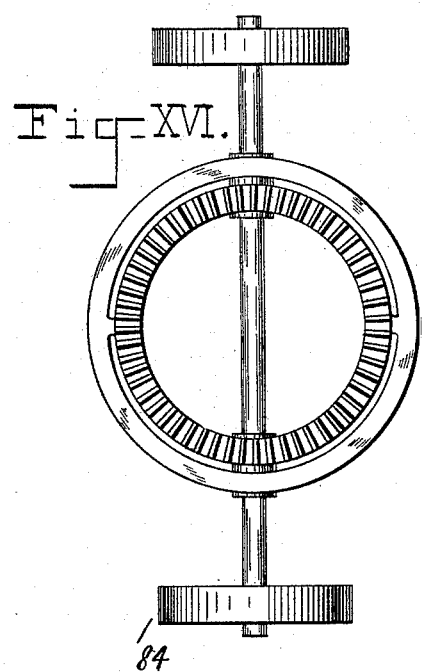
Fig. XVI.
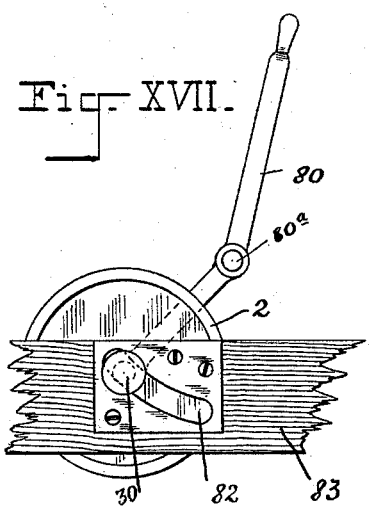
Fig. XVII.
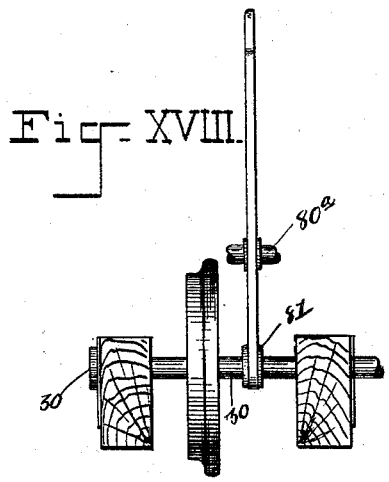
Fig. XVIII.
Witnesses
Frank Gurle
Lillie Hanna
Inventor
James M. O'Kelly
by Knight Bros.
Atty's

United States Patent Office.

JAMES M. O'KELLY, OF NEW YORK, N. Y., ASSIGNOR OF THREE-FOURTHS TO FRANCISCO COMAS AND JOAQUIN A. HERMIDA, OF SAME PLACE.

MOTOR TRAM-CAR.

SPECIFICATION forming part of Letters Patent No. 477,444, dated June 21, 1892.

Application filed December 27, 1890. Serial No. 375,997. (No model.)

*To all whom it may concern:*

Be it known that I, JAMES MORRIS O'KELLY, a citizen of the United States, residing in the city, county, and State of New York, have invented certain new and useful Improvements in Tram-Cars and Motors Therefor, of which the following is a specification.

My invention relates, primarily, to a new and improved method of supplying tram-cars or street-cars with independent means of propulsion, whereby the power can be generated in each car and the engine and its appurtenances utilized for traction purposes.

My invention consists, secondarily, in a novel braking apparatus which is adapted to utilize the weight of the car-body for braking weight and impetus of the car-body; and it consists, specifically, in the mode of mounting the car-body upon the parts of the braking-gear, whereby when the braking-lever is applied the brake-shoes and the car-wheels will be made to sustain the weight of the car-body, and the momentum of the car will be incidentally utilized at the same time.

My invention relates, thirdly, to means for derailing the car at any desired point, and providing independent carrying-wheels adapted to be turned in any direction and travel on any suitable road-bed.

Referring to the accompanying drawings, which form a part of this specification, Figure I is a longitudinal section, partly in elevation, of one of my improved tram-cars embracing my various improvements. Fig. II is an end view. Figs. III and IV are detail views. Fig. V is a sectional view of the engine-cab. Fig. VI is a plan view of the car. Fig. VII is a cross-section of my clutch. Fig. VIII is a detail view. Fig. IX is an end elevation of the gas-engine and its connections with the clutch. Fig. X is a detail view of the clutch-applying mechanism. Fig. XI is a detail view of the braking mechanism. Figs. XII, XIII, and XIV are views illustrating my method of cooling the gas-engine. Figs. XV to XVIII, inclusive, illustrate my method of removing the ordinary car-wheels which operate in connection with the track and substituting therefor traction-wheels adapted to run on ordinary roadways.

In Fig. I, 1 represents a car-body provided with wheels 2. At 3 I show a stairway leading from the platform to the top of said car, and on the top I place seats 4, having reversible backs 5 and staples 6, in which are supported awnings 7, which may be removed when desired. At 8 I show push-buttons which are adapted to operate signal 9 for notifying the conductor to stop the car. At 10 on the uprights 11 I provide pins, in which the double bracket-arms 12 can be supported by inserting the pins 10 in the openings 13 in said bracket-arms, and these bracket-arms when thus supported, as shown in Figs. II and III, are adapted to receive the eyes 14 of awnings or curtains 15. When the weather justifies, however, these awnings can be pulled farther down and the eyes 16 can be slipped over the receiving fingers or pins 17 at the bottom of the car. This will inclose the entire car-body and render it proof against inclement weather. The pins 17 are removable, and are made, preferably, in the form shown in Fig. IV.

In Fig. V, I show the gas-engine 18, provided with fly-wheel 19, mounted in the forward part of the car. The gas is carried in the storage-tank 20 at the top of the car and just beneath the roof and is supplied through the medium of a pipe 21, provided with a stop-cock, as shown in Fig. I. The gas-engine may be one of any approved type, such as shown in Fig. IX, and is connected by gearing 22 23 24 to the clutch upon the axle of the car, the gearing 24 constituting part of said clutch, as shown in Figs. II, VI, VII, and IX. The clutch has also another member 25, which consists of a flanged disk, in which the sliding blocks 26 operate through the medium of arms 27, connected to the annular collar 28, keyed by means of pin 29 to the axle 30 of the car and adapted to be operated by lever 31 through the medium of pivot 32. The lever 31 is swiveled to a frame 34 at 33 of the car-body and is operated through the medum of lever 35, which is provided with a pin 36, sliding in the slot 37 of the lever 31. The lever 35 is operated by means of handle 38, the latter lever being extended up into the engine-cab, as shown at 39 in Fig. 5.

The means for applying brakes to the peripheries of the wheels of my improved tram-car is shown in Figs. VI and XI. In Fig. VI, I show frame 40, provided with anti-friction rollers 41. The car-body 42, which is mounted upon the ordinary spring-bolsters of the truck-frame also rests upon said rollers, and the frame 40 has suspended from it brake-blocks 43, which are adapted to press against the peripheries of the wheels 2 and are adapted to this purpose in the following manner: At 44 I provide a cross-bar having a centrally-located pin 45, which connects with an endless sprocket-chain 46, as shown in Fig. VI, which sprocket-chain works in connection with two sprocket-wheels 47. The forward sprocket-wheel is mounted on a rotating axle 48, and is connected to the engineer's cab through the medium of the lever 49, (shown in Fig. V,) so that when the lever 49 is drawn backward the shaft 48 will be turned, thereby rotating the sprocket-drums 47 and drawing sprocket-chain 46, and consequently the cross-bar 44, forward, thus applying the brakes, the car-body being mounted upon the truck-frame by suitable springs, so that it cannot move longitudinally with relation thereto, and the longitudinally-movable brake-frame being mounted upon suitable anti-friction rollers between the truck-frame and car-body. When the brake-frame is moved longitudinally by the means described, the brake-blocks will be thrown in contact with the wheels, which will tend to raise the brake-frame from the truck-frame, but which tendency is arrested by the weight of the car-body on said brake-frame, whereby the weight of the car-body is utilized to brake the car.

At 61 and 62 in Fig. V, I show the means for conveying the gas to the various parts of the car from the storage-reservoir 20 (see Fig. II) and for conveying the products of combustion from the engine.

In Figs. XII, XIII, and XIV, I show means for cooling the gas-engine. This consists of a chamber of water 63, which is provided with pipes leading to the gas-engine and with a pipe 64 leading therefrom which at its outer end terminates in flat discharge-pipes 65. Fresh air is admitted through the pipe and funnel 66, the air rushing in as the car progresses and is discharged against the spray 67, which leaves the flattened nozzle 65 of the water-pipe. By this means the water is cooled and the air is led from the water-chamber by means of pipe 68.

When it is desired to leave the tramway and to operate the car as a traction-carriage upon an ordinary roadway, I throw back the lever 80, (shown in Figs. XV to XVIII,) which is pivoted to the truck-frame at 80ª and pivotally connected at its lower end 81 with the axle 30, which is adapted to slide in curved slots 82 in the frame of the car 83, and which serve to throw the ordinary flanged wheels 2, mounted upon said axle, out of operative position and permit the wheels 84, which have flat bearing-surfaces, to come into play. These latter wheels can be turned and controlled through the medium of a lever 85, having formed on its lower end the quadrant segment-gear 86, which meshes with a complementary circle of gear-teeth 87, formed on the fifth-wheel, which is attached to the axle.

Having thus described my invention, the following is what I claim as new therein and desire to secure by Letters Patent:

1. A passenger-car having seats 4 provided with backs 5 and awning-staples 6, in combination with furling awnings 7 and furling-cords, as herein set forth.

2. In combination with a car, an axle, a clutch adapted to throw the axle into and out of gear with the actuating mechanism and provided with a grooved collar, a lever 31, pivoted at one end to the frame and carrying a vertical friction-roller working in the groove of said collar and having an acute-angled slot at its other end, and a pivoted operating-lever 35, provided with a pin which engages in the acute-angle slot of the lever 31, substantially as herein set forth.

3. The combination, with a truck-frame suitably mounted upon wheels, of a longitudinally-movable frame supported upon said truck-frame and carrying a series of brake-blocks, a car-body mounted upon said truck-frame, and means for moving the frame longitudinally for applying the brakes, whereby the weight of the car-body is utilized for the braking pressure, as herein set forth.

4. The combination, with a truck-frame suitably mounted upon wheels, of a longitudinally-movable frame supported upon said truck-frame and carrying a series of brake-blocks, a car-body also mounted upon said truck-frame, springs for holding the frame carrying the brake-blocks normally in disengaged position, and means for moving the frame longitudinally against the action of said springs for applying the brakes, as herein set forth.

5. The combination, with a truck-frame suitably mounted upon wheels, of a longitudinally-movable frame supported upon said truck-frame and carrying a series of brake-blocks, a car-body mounted upon said truck-frame, springs for holding the frame carrying the brake-blocks normally in disengaged position, drums or wheels 47, mounted upon the truck-frame, a chain 46, carried by said drums and attached to the longitudinally-movable frame, and means for operating said drums for applying the brakes, as herein set forth.

6. The combination, with a truck-frame suitably mounted upon wheels, of a longitudinally-movable frame supported upon said truck-frame and carrying a series of brake-blocks, a car-body also suitably mounted upon said truck-frame above said longitudinally-moving frame, friction-rollers 41 in said movable frame upon which the car-body rests, and means for moving the frame longitudinally, as herein set forth.

7. In combination with a truck-frame, flanged wheels mounted upon suitable axles which are adjustably supported in suitable slots in the truck-frame, mechanism for raising and lowering said flanged wheels, and flat-surface wheels mounted upon suitable axles, which are supported in fixed bearings, for the purpose herein set forth.

8. In combination with a truck-frame, flat-surface wheels mounted in fixed bearings in said truck-frame, flanged wheels which are adjustably journaled in suitable slots in the truck-frame, and an operating-lever pivoted in said truck-frame and engaging the axle of the flanged wheels, whereby they can be raised or lowered, as herein set forth.

9. In combination with a truck-frame, broad-surface wheels mounted in said frame upon a suitable axle, a fifth-wheel provided with a circle of gear-teeth secured to said axle, a lever pivoted to the truck-frame and provided with a quadrant-shaped segment-gear at its lower end for engaging with the gear-circle on the fifth-wheel for controlling the position of the broad-surface wheels, as herein set forth.

JAS. M. O'KELLY.

Witnesses:
WM. H. HENDEE,
FRANK GUILE.